United States Patent [19]

Van Straaten

[11] 3,904,823

[45] Sept. 9, 1975

[54] CIRCUIT ARRANGEMENT FOR GENERATING A CONTROL SIGNAL FOR THE FIELD OUTPUT STAGE IN A TELEVISION RECEIVER

[75] Inventor: Jan Van Straaten, Nijmegen, Netherlands

[73] Assignee: U.S. Philips Corporation, New York, N.Y.

[22] Filed: Nov. 20, 1973

[21] Appl. No.: 417,549

[30] Foreign Application Priority Data

Nov. 24, 1972 Netherlands ...................... 7215930

[52] U.S. Cl. ....................... 178/69.5 TV; 178/7.3 S

[51] Int. Cl.[2] ........................................ H04N 5/06

[58] Field of Search ..... 178/69.5 TV, 69.5 G, 7.3 S; 179/15 BS; 328/72, 74, 155; 340/146.1 D

[56] References Cited

UNITED STATES PATENTS

| | | | |
|---|---|---|---|
| 3,061,674 | 10/1962 | Janssen et al. | 178/69.5 TV |
| 3,619,497 | 11/1971 | Ellis | 178/69.5 TV |
| 3,708,621 | 1/1973 | Yamamoto | 178/69.5 TV |

*Primary Examiner*—Malcolm A. Morrison
*Assistant Examiner*—Errol A. Krass
*Attorney, Agent, or Firm*—Frank R. Trifari; Henry I. Steckler

[57] ABSTRACT

A circuit arrangement for generating a control signal for the field output stage in a television receiver, provided with a frequency divider circuit by which the double line frequency is divided by a number equal to the number of lines per image. An automatic selection circuit insures that direct synchronization is used in the off-phase state and in case of reception of non-standard signals (for example, from video recorders).

10 Claims, 5 Drawing Figures

Figure 1:
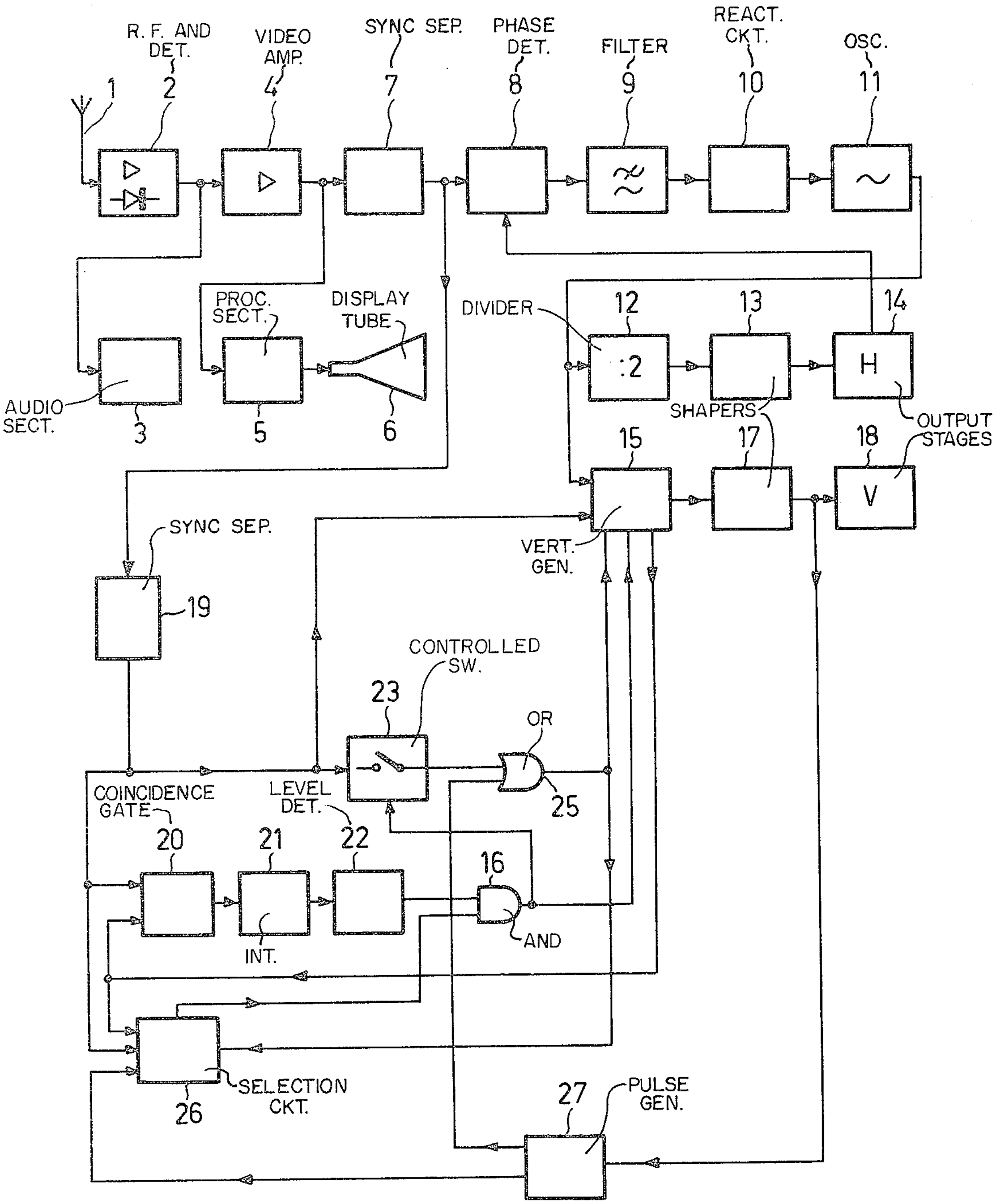

CIRCUIT ARRANGEMENT FOR GENERATING A CONTROL SIGNAL FOR THE FIELD OUTPUT STAGE IN A TELEVISION RECEIVER

The invention relates to a circuit arrangement for generating a control signal for the field output stage in a television receiver suitable for the reception of line and field synchronizing pulses, in which a number of fields constitutes an image, provided with a generator for generating a signal of the line frequency of an integer multiple thereof, a frequency divider circuit and means for applying received field synchronizing pulses to a comparison stage for comparing the phase between these pulses and the pulses generated by the frequency divider circuit, the comparison stage being capable of applying a signal to a gate which signal is dependent on the phase difference between the compared pulses, the circuit arrangement being switchable between direct and indirect synchronization.

Such a circuit arrangement is described in U.S. Pat. No. 3,708,621. Since in this known circuit arrangement the control signal is derived from the line synchronizing signal by means of frequency division, the frequency thereof is correct as soon as the line synchronizing circuit has synchronized in frequency with respect to the received line synchronization signal, which is generally effected fairly quickly. The correct phase of the field control signal obtained relative to the field synchronizing pulses originating from the transmitter and received by the television receiver is insured by the comparison stage which may be formed as a coincidence gate, and an integrator. In the off-phase state the comparison stage provides a plurality of pulses so that the integrator supplies a signal after a given period which enables the gate. The frequency divider circuit is then reset: this is direct synchronization in which the generated control signal is directly influenced by the received synchronizing pulses. The phase is then correct, the comparison stage no longer provides any pulse and the received synchronizing pulses can in principle no longer reach the divider circuit, at least not as long as the signal generated by the circuit arrangement maintains the same frequency and same phase as the received pulses: this is indirect synchronization in which the received synchronizing pulses cannot directly influence the generated control signal.

It is an object of the invention to provide a circuit arrangement which is also suitable for the reception of "non-standard signals" which are signals in which the number of lines per image deviates from the number prescribed in the relevant television system. Such signals are generated by some test signal generators in which the displayed image is not interlaced and which are used, for example, for adjusting the convergence in colour television receivers or may be produced when using video recorders, for example, for the display of still pictures. Field synchronization with the known circuit arrangement is impossible when such signals are received, for the frequency of the received field synchronizing pulses deviates from the frequency of the pulses obtained by division so that a vertical roll-over is obtained. Some received synchronizing pulses reset, however, the frequency divider circuit so that the image occasionally jumps in the vertical direction.

The circuit arrangement according to the invention is characterized in that it further comprises a gating pulse generator generating gating pulses, namely a first gating pulse during the occurrence of which the frequency divider circuit is reset in the off-phase state of the compared pulses and a second gating pulse which is applied to an automatic selection circuit which selection circuit switches the circuit arrangement to indirect synchronization when a received field synchronizing pulse and a pulse generated by the frequency divider circuit at least partly coincide, and switches the circuit arrangement to direct synchronization when said pulses do not coincide during the occurrence of the second gating pulse.

Figure 2:
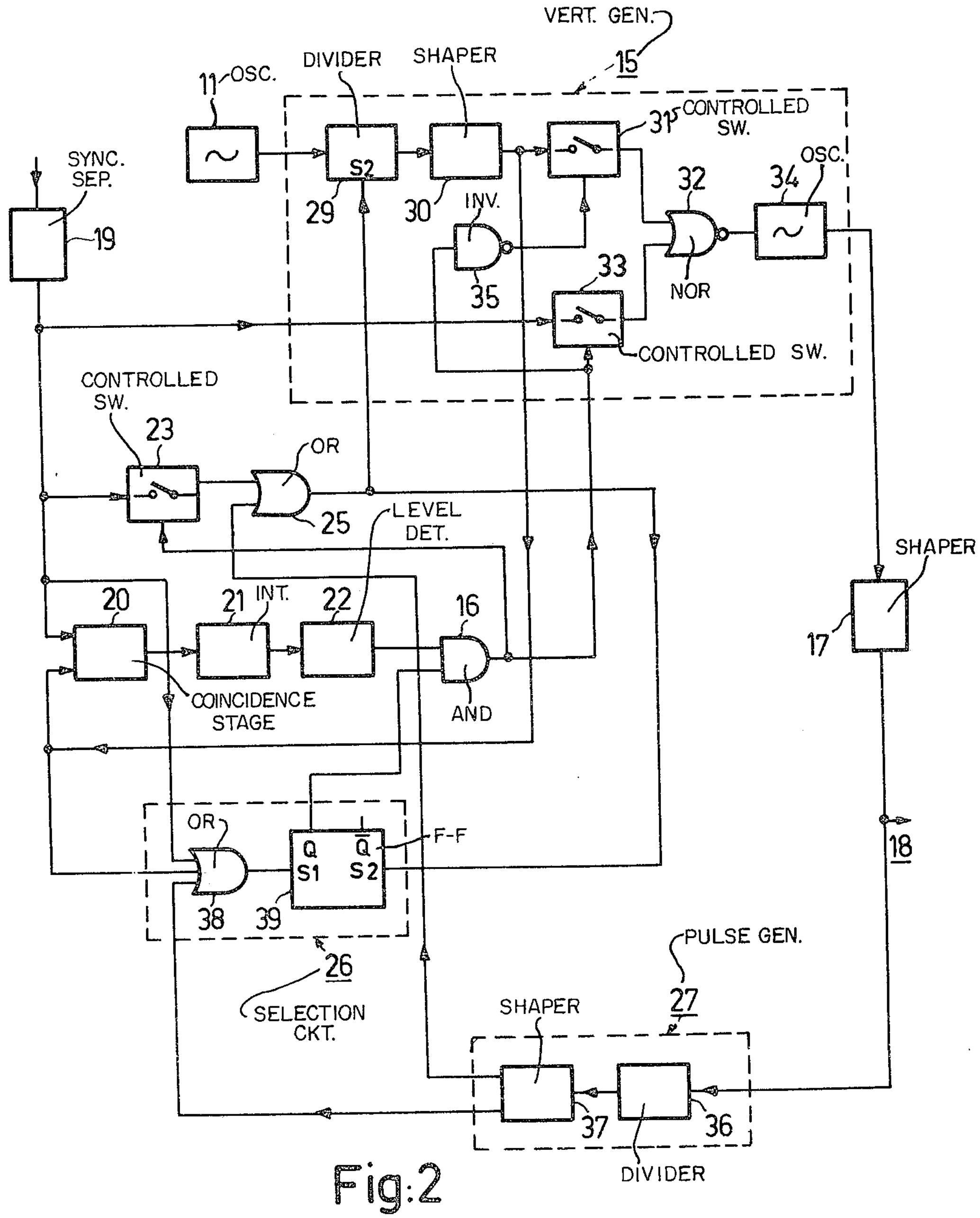
Figure 3:
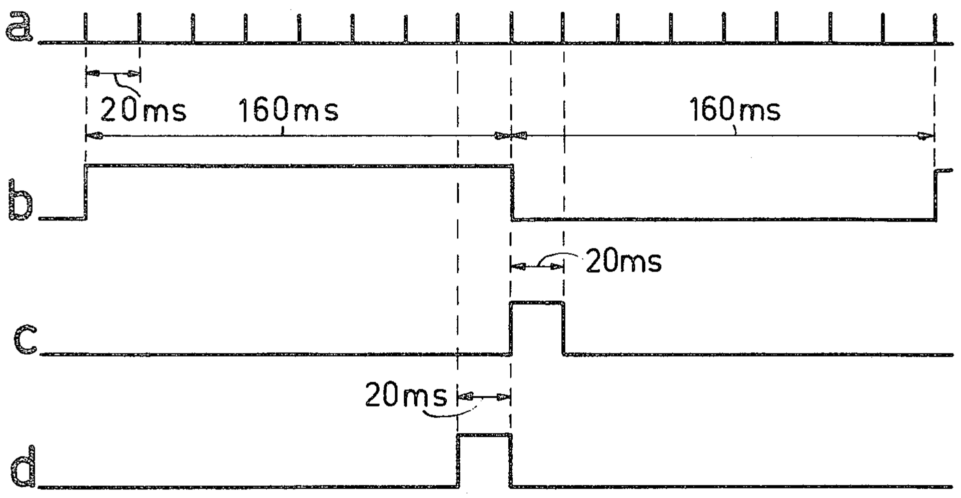
Figure 4:
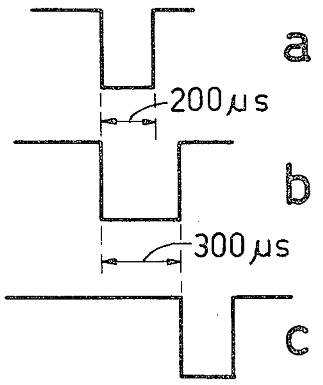
Figure 5:
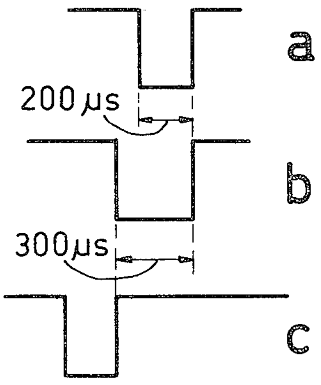

The invention will be described in greater detail by way of example with reference to the accompanying Figures in which FIG. 1 shows a block-schematic diagram of a television receiver provided with the circuit arrangement according to the invention, FIG. 2 shows details of the circuit arrangement according to the invention, FIGS. 3, 4 and 5 show waveforms which occur in the circuit arrangement according to the invention.

In FIG. 1, 1 is an aerial by which a television signal can be received. This signal is applied to an RF and detection section 2. The detected signal subsequently reaches the audio section 3 of the television receiver and a video amplifier 4 at the output of which a complete video signal, possibly with a chrominance signal in the case of colour television is available. This signal is applied to a section 5 in which it is processed whereafter a picture display tube 6 is controlled, and to a sync. separator 7. The output voltage thereof includes line synchronizing pulses which are applied to a phase detector 8 whose output voltage can influence an oscillator 11 through a flywheel filter 9 and a reactance circuit 10. Oscillator 11 generates a voltage of the double line frequency $2f_H$, i.e., 31250 Hz upon reception of a signal in accordance with the television system using 625 lines per complete image, 2 interlaced fields per image and 50 fields per second. Another possibility is that oscillator 11 generates a voltage of the line frequency $f_H$ whose frequency is subsequently doubled. The voltage of the frequency $2f_H$ controls a frequency divider circuit 12 in which its frequency is divided by two and the signal thus obtained is applied through a pulse shaper 13 to the line output stage 14 which provides the line deflection current for the deflection coil (not shown) for the horizontal deflection of the electron beam(s) in tube 6.

The voltage available at the output of oscillator 11 is also applied to a generator 15 of field frequency signals in which its frequency is divided by the divisor 625 and is further processed. When oscillator 11 has the correct frequency after in frequency synchronization of the circuit 8, 9, 10, 11 for the indirect line synchronization, the frequency of the signal generated by generator 15 is also correct, that is to say, it is equal to the field frequency at the mentioned standard of 50 Hz. A pulse shaper 17 receives the signal generated by generator 15 and controls the field output stage 18 which applies the field deflection current to the deflection coil (not shown) for the vertical deflection of the electron beam(s) in tube 6. Both the line and the field control signals have the waveform required for stages 14 and 18 due to the two pulse shapers 13 and 17, respectively. If the output signal of divider circuit 12 or generator 15 has already this shape, pulse shapers 13 and 17, respectively, may be omitted.

The output voltage of sync. separator 7 also includes field synchronizing pulses which are separately obtained by means of a field sync. separator 19 and are subsequently applied to an input of a coincidence gate 20. The divider pulses originating from an output of generator 15 are present at a second input of gate 20. In the on-phase state that is to say, in the case where a field synchronizing pulse originating from separator 19 and a divider pulse coincide at least partly, stage 20 does not provide a signal. In the off-phase state it provides a signal namely the divider pulse for an integrator 21 which is followed by a level detector 22. When this state lasts at least approximately 0.4 s which corresponds to approximately 20 pulses, the detected level exceeds a given threshold value so that a signal is applied to an input of an AND gate 16. The field synchronizing pulses at the output of separator 19 reach an input of an OR-gate 25 through a controlled switch 23 which can be rendered conducting by the output signal from gate 16. The same output signal is also applied to generator 15.

A further input of gate 16 is connected to an output of an automatic selection circuit 26 while the output signal from gate 25 is applied in a manner to be described hereinafter to generator 15 and to circuit 26. The output signal from pulse shaper 17 is applied to a pulse generator 27 having two outputs one of which is connected to an input of gate 25 and one is connected to an input of circuit 26. The divider pulses which are applied to coincidence stage 20 are also applied to an input of selection circuit 26 while another input thereof as well as another input of generator 15 receive the pulses originating from separator 19.

A control signal for the field output stage is generated by generator 15 with the aid of pulse generator 27 and selection circuit 26. This control signal always has the correct frequency and the correct phase after a short pull-in period irrespective of whether the field synchronizing pulses received from separator 19 are standard signals or not. This will be explained with reference to FIG. 2 in which elements 15, 26 and 27 of FIG. 1 are shown in greater detail.

Generator 15 includes a frequency divider circuit 29 which in known manner, for example, by means of bistable elements, divides the frequency $2f_H$ of the signal generated by oscillator 11 by 625. As is known ten bistable elements must be present so that the output signal from circuit 29 has a natural frequency of $(2f_H/2^{10})$ which corresponds to a natural period of approximately 33ms. Circuit 29 is internally reset after a field period i.e., approximately 20 ms after the commencement of the period, i.e., $20 - 33/2 \approx 3.5$ ms after reversal in the middle of the natural period. A pulse shaper 30 reduces this flyback pulse to approximately 300 $\mu$s which is slightly longer than the field synchronizing pulse provided by separator 19 and whose duration is approximately 200 $\mu$s. These pulses are compared in coincidence stage 20. The output signal from pulse shaper 30 also reaches through a first controlled switch 31 a NOR-gate 32. A further input of gate 32 receives through a second controlled switch 33 the output signal from separator 19. The output signal from gate 32 serves as a trigger signal for an oscillator 34 formed in known manner which provides the output signal of generator 15. Switch 33 can be rendered conducting by the output signal from gate 16 while the same signal can render switch 31 conducting through an inverter stage 35. Finally the reset terminal ($S_2$) of divider circuit 29 is connected to the output of gate 25.

Pulse generator 27 includes an auxiliary frequency divider circuit 36 which may be a counter and by which the repetition frequency in this example 50 Hz of its input signal (FIG. 3*a*) is divided by an integer $n$. In this example $n$ is equal to 16, so that the output signal from circuit 36 has a period of $n \times 20 = 16 \times 20 = 320$ ms and has the shape as is shown in FIG. 3*b*. This signal is applied to a gating pulse shaper 37 which generates in known manner two series of gating pulses of the same repetition frequency as that of the signal in FIG. 3*b*. The first gating pulse (FIG. 3*c*) is applied to gate 25 and has a duration of approximately 20 ms, that is to say approximately one field period. It is generated for example by a monostable element which is responsive to a trailing edge of the signal in FIG. 3*b*. The second gating pulse (FIG. 3*d*) has approximately the same duration as the first and occurs a given number of field periods later, in this example $n - 1 = 15$, so that its final edge coincides with the leading edge of the next first gating pulse. The second gating pulse is applied to an input of an OR gate 38 forming part of the automatic selection circuit 26. In FIG. 3*a* the field frequency pulses are shown to be very narrow. In practice they have a given duration so that every time one of these pulses coincides with one of the pulses of FIG. 3*c* and FIG. 3*d*. The pulses of FIG. 3*c* and 3*d* may alternatively be shifted in such a manner that they commence and end in the period located between two pulses of FIG. 3*a*.

The divider pulses from pulse shaper 30 and the synchronizing pulses from separator 19 are applied to other inputs of gate 38. The outputs of gate 38 and of gate 25 are connected to the set ($S_1$) and reset terminals ($S_2$), respectively, of a flipflop 39 whose Q-output is connected to an output of gate 16.

Oscillator 34 is a free-running oscillator, for example an astable multivibrator, which receives trigger pulses through a gate 32. FIG. 2 shows that these pulses originate from either separator 19 (direct synchronization), or from frequency divider circuit 29 (indirect synchronization), which will now be described in greater detail.

In the on-phase state level detector 22 does not apply a signal to gate 16 which may be indicated by the binary digit 1. During the period of the second gate pulse all input signals from gate 38 coincide at least partly which corresponds to the digit 0 for each input. Under these circumstances the output signal from gate 38 is also 0, that is to say, a set pulse is applied to terminal $S_1$ of flipflop 39 so that the output signal Q thereof is 1. The output signal from gate 16 is therefore 1 with the result that switches 23 and 33 are cut off when switch 31 is conducting. The divider pulses are applied through gate 32 to oscillator 34. One of the inputs of gate 25 conveys the signal 1, the output signal thereof is consequently 1: neither divider circuit 29 nor flipflop 39 can be reset. As long as the on-phase state prevails, which means that coincidence occurs every second gating pulse at gate 38 and that level detector 22 provides the signal 1, the situation shown is maintained while the generated control signal cannot be influenced by the received synchronizing pulses.

When the off-phase state occurs, level detector 22 provides after approximately 0.4 s a signal which is equal to 0 for gate 16. The output signal thereof becomes 0 so that switches 23 and 33 conduct while switch 31 is cut off. The synchronizing pulses received from separator 19 are applied through gate 32 to oscillator 34 while the divider pulses cannot influence this oscillator (direct synchronization). The generated control signal is then synchronous with the received signal, but as is shown the duration of this state must be short due to the higher sensitivity to interference of the circuit at least when receiving broadcasting television signals. This is effected as follows. Since the first gating pulse from generator 27 takes approximately one field period a synchronizing pulse occurs fairly quickly simultaneously with a first gating pulse. Both inputs of gate 25 are therefore equal to 0 so that the output thereof is also 0. Frequency divider circuit 29 is reset. Since there is no coincidence in gate 38 the output signal thereof is equal to 1. This is the signal at the terminal $S_1$ of flipflop 39 while terminal $S_2$ receives a 0. Flipflop 39 is thus reset: Q becomes 0, but circuit 26 has no influence on the rest of the circuit because level detector 22 provides a signal which is equal to 0 for gate 16.

When the incoming signals are standard signals, the above-described situation remains while the divider pulses and the synchronizing pulses are always in phase, this until the occurrence of the next second gating pulse from pulse generator 27. During this occurrence the three input signals of gate 38 are equal to 0 so that a reset pulse 0 is applied to the terminal $S_1$ of flipflop 39: Q becomes 1. The input signals from coincidence stage 20 coincide since the beginning of the direct synchronization so that both input signals of gate 16 become equal to 1 at the instant when Q = 1. The output signal from gate 16 thus becomes 1 so that switches 23 and 33 are cut off and switch 31 conducts. Consequently the received signal does not reach the oscillator 34 while the divider pulses are applied to this oscillator (indirect synchronization). Nothing is changed in the state of divider circuit 29 because the output signal of switch 23 and consequently that of gate 25 becomes equal to 1 so that circuit 29 and flipflop 39 are not reset.

After the second gating pulse the output signal from gate 38 becomes equal to 0, but this does not change the state of flipflop 39. During the next second gating pulse a set pulse is applied to flipflop 39 but the output signal Q thereof was already 1 and thus does not change. The foregoing shows that the time elapsing until indirect synchronization occurs is as long as the time interval between both gating pulses, i.e., in the described example $(n-1) \times 20 = 15 \times 20 = 300$ ms after the off-phase state is established, i.e., approximately 0.4 s after its occurrence, increased by the time which is necessary for coincidence of a synchronizing pulse with a first gating pulse. Since the divisor corresponding to the incoming synchronizing pulses will not deviate in practice very much from 625 the latter period will last not more than a period of the first gating pulse, i.e., 320 ms. This is the reason why both gating pulses have a duration of approximately one field period. When this duration is shorter it is possible that no coincidence is effected even when receiving standard signals so that the circuit never pulls in. On the other hand a too long duration might render the circuit more sensitive to interference. FIG. 3 shows that a duration of approximately one field period can simply be realized.

When the incoming signals are not standard signals the circuit behaves in a different manner. Since divider circuit 29 is reset during the occurrence of the first gating pulse the two input signals from coincidence stage 20 coincide at least once. It is however uncertain whether this happens more than once and what is the output signal from level detector 22. This, however, has no influence on the manner of synchronization: in fact the divider pulse and the synchronizing pulse do not occur simultaneously during the occurrence of the second gating pulse so that the output signal Q from flipflop 39 remains equal to 0 and hence those of gates 16 and 25 also remain 0 independent of the situation in stage 20. As long as non-standard signals are received the synchronization of oscillator 34 thus remains direct which is no drawback because the signal generated by test signal generators and video recorders generally includes little noise and interference.

Divider circuit 29 is reset at each first gating pulse. When the incoming signal is a standard signal, the divider pulses and the synchronizing pulses are in phase. At the next second gating pulse coincidence is effected in gate 38 so that the circuit is immediately switched over to indirect synchronization. Otherwise a new cycle of $n$ field periods will start. Another function of resetting divider switch 29 every time is the following. When receiving nonstandard signal the time difference between the divider and the synchronizing pulse would increase without this step, with the risk that coincidence might take place in gate 38 at an arbitrary instant so that an unwanted indirect synchronization might be the result.

After the divider pulse and the synchronizing pulse have coincided during the occurrence of the first gating pulse a time difference increasing each period is produced between these pulses upon reception of non-standard signals. Since the period of the signal generated by oscillator 11 is $1/2f_H \approx 32$ $\mu$s, this difference after one field period is equal in $\mu$s to $32 \times (625 - d)$ in which $d$ is the divisor of the incoming signal deviating from 625. The number $n$ must be chosen to be such that the time difference $(n-1) \times 32 \times (625-d)$ can be observed by gate 38 after $n-1$ periods. FIG. 4$a$ shows a synchronizing pulse and FIG. 4$b$ shows a divider pulse which pulses have the stated duration of approximately 200 $\mu$s and in an extreme case of the on-phase state this is the state at which the two leading edges coincide. FIG. 4$c$ shows the extreme case of the off-phase state which might occur subsequently and which is the state at which the leading edge of the synchronizing pulse coincides with the trailing edge of the divider pulse. FIG. 5$a$, 5$b$ and 5$c$ show the opposite situation. FIG. 4$a$, 4$b$, 4$c$, and 5$a$, 5$b$ and 5$c$ show that the above-mentioned time difference must be in the order of 300 $\mu$s. The number $n$ is thus determined by the condition $$n - 1 \geq \frac{300}{32(625-d)}$$

which proves that the more the divisor $d$ deviates from 625 the less $n$ may be. When for the sake of security the smallest possible difference $625-d = \pm 1$ is chosen, i.e., $d$ is 624 or 626, a value is found for $n$ which is at least equal to 11. Auxiliary frequency divider circuit 36 might in principle divide the field frequency by 11, but it is simpler to divide by 16, for example, by means of four binary elements, for example, flipflops. As a result the pull-in time is slightly extended relative to the case where $n = 11$, namely 300 ms instead of $10 \times 20 = 200$ ms, but it is still acceptable while also the reliability and the insensitivity to interference are increased.

The foregoing shows that the output signal Q from automatic selection circuit 26 is equal to 0 in the off-phase state and becomes 1 after some time when standard signals are received so that synchronization is firstly effected directly and then indirectly. When receiving nonstandard signals Q remains equal to 0 so that direct synchronization is maintained.

It will be noted that the gating pulses in FIGS. 3*c* and 3*d* succeed each other after $n-1$ field periods so that the final edge of one pulse coincide with the leading edge of the other. It will be evident that this is not of essential importance, that is to say, a given time may elapse between these edges. Neither is it necessary for auxiliary frequency divider circuit 36 to divide the frequency of the signal from pulse shaper 17 and not, for example, that from oscillator 34 or from divider circuit 29. Oscillator 34 may be omitted in the case where the output signal from gate 32 has the correct waveform to control pulse shaper 17. In the embodiment of FIG. 2 the gating pulses are obtained by means of auxiliary frequency divider circuit 36. A different method is alternatively possible, namely the integration of the pulses of FIG. 3*a*. By means of suitable pulse shapers gating pulses can then be obtained whose repetition frequency is not necessarily equal to the field frequency divided by an integer such as is the case with circuit 36.

The so-called negative logic is used in the foregoing, that is to say, the logic in which 0 means "signal" and 1 means "not signal." It is obvious that this choice is not important for the essence of the invention. With the positive logic only the terms for the logical gates shown in FIGS. 1 and 2 would have to be changed in known manner.

Elements 10 to 13, 15 to 17 and 20 to 27 of the described circuit, except for a capacitor optionally associated with integrator 21 may advantageously be integrated in a semiconductor body. In view of the large number of components thereof it is obvious that a non-integrated embodiment would not be economical. It may be noted that the described embodiment includes binary elements. Embodiments of the same scope as in the present application are, however, feasible in which different elements may be used.

A television system using 625 lines per image, 2 interlaced fields per image and 50 fields per second has been used hereinbefore as an example. It will be evident that modifications of the circuit according to the invention are possible without essential difference for the reception of television signals in accordance with a different system.

What is claimed is:

1. A circuit arrangement for generating a control signal for the field output stage in a television receiver suitable for the reception of line and field synchronizing pulses, in which a plurality of fields constitutes an image, said circuit arrangement comprising a generator for generating a signal of the line frequency or an integer multiple thereof, a field frequency generator coupled to said line frequency generator including a frequency divider circuit having an initial state, means for applying received field synchronizing pulses to a comparison stage for comparing the phase between these pulses and the pulses generated by the frequency divider circuit, the comparison stage applying a signal to a gate associated with said comparison stage, which signal is dependent on the phase difference between the compared pulses, the field generator having direct and indirect synchronization states, a gating pulse generator generating gating pulses, namely a first gating pulse during the occurrence of which the frequency divider circuit is reset to said initial state in the off-phase state of the compared pulses and a second gating pulse which is applied to an automatic selection circuit coupled to said field frequency generator, which selection circuit switches the field generator to the indirect synchronization state when a received field synchronizing pulse and a pulse generated by the frequency divider circuit at least partly occur simultaneously, and switches the field generator to the direct synchronization state when said pulses do not coincide during the occurrence of the second gating pulse.

2. A circuit arrangement as claimed in claim 1, wherein the gating pulses and the frequency divider pulses each have a repetition frequency, the repetition frequency of the gating pulses is equal to the repetition frequency of the pulses generated by the frequency divider circuit divided by an integer $n$ and that each second gating pulse occurs a number of field periods after a first gating pulse.

3. A circuit arrangement as claimed in claim 2, wherein the pulse duration of the two gating pulses is at least approximately one field period.

4. A circuit arrangement as claimed in claim 1, wherein the automatic selection circuit includes a gating device and a bistable element, the field synchronizing pulses, the pulses generated by the frequency divider circuit and the second gating pulses being applied to said gating device, the output signal from the gating device being applied to the bistable element an output signal of which is a second input signal for the gate associated with the comparison stage.

5. A circuit arrangement as claimed in claim 4, wherein said bistable element has a state corresponding to direct synchronization and further comprising a second gating device receiving field synchronizing pulses through a controlled switch rendered conducting by the gate associated with the comparison stage during the off-phase state of the compared pulses, the output signal from the second gating device resetting the frequency divider circuit during the occurrence of the first gating pulse and bringing the bistable element into the state corresponding to the direct synchronization.

6. A circuit arrangement as claimed in claim 1, further comprising a free-running oscillator which is synchronized by the pulses originating from the frequency divider circuit in case of indirect synchronization and by the received field synchronizing pulses in case of direct synchronization.

7. A circuit arrangement as claimed in claim 1, wherein at least the frequency divider circuit, the gating pulse generator, the automatic selection circuit and the gating devices are integrated in a semiconductor body.

8. A circuit arrangement as claimed in claim 2, wherein the gating pulse generator includes an auxiliary frequency divider circuit for dividing the repetition frequency of the pulses generated by the frequency divider circuit.

9. A circuit arrangement as claimed in claim 8, wherein the integer $n$ is determined by the condition $$n - 1 \geq \frac{300}{32(N-d)}$$

wherein $N$ is the number of lines per image in the television system for which the television receiver is suitable and $d$ is chosen as a function of the number of lines per image of the received television signal.

10. A circuit arrangement for generating a control signal for the field output stage in a television receiver suitable for the reception of line and field synchronizing pulses, in which a plurality of fields constitutes an image, said circuit comprising a generator means for generating a signal of the line frequency or an integer multiple thereof, a field frequency generator circuit coupled to said line frequency generator and having direct and indirect synchronization states and including a frequency divider circuit having an initial state, a comparison stage means coupled to said divider, means for applying received field synchronizing pulses to said comparison stage means for comparing the phase between these pulses and the pulses generated by the frequency divider circuit, a gate, the comparison stage means comprising means for applying a signal to said gate which signal is dependent on the phase difference between the compared pulses, an automatic selection circuit coupled to said gate, a gating pulse generator means coupled to said selection circuit for generating gating pulses, said pulses comprising a first gating pulse during the occurrence of which the frequency divider circuit is reset to said initial state in the off-phase state of the compared pulses and a second gating pulse which is applied to said automatic selection circuit which selection circuit switches the field generator circuit to indirect synchronization when a received field synchronizing pulse and a pulse generated by the frequency divider circuit at least partly occur simultaneously, and switches the field generator circuit to direct synchronization when said pulses do not coincide during the occurrence of the second gating pulse.

* * * * *